(12) United States Patent
Artiuch

(10) Patent No.: US 10,935,401 B2
(45) Date of Patent: Mar. 2, 2021

(54) OPERATING A GAS METER WITH A SMART POWER SUPPLY

(71) Applicant: Natural Gas Solutions North America, LLC, Houston, TX (US)

(72) Inventor: Roman Leon Artiuch, Houston, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 511 days.

(21) Appl. No.: 15/812,781

(22) Filed: Nov. 14, 2017

(65) Prior Publication Data

US 2019/0145804 A1     May 16, 2019

(51) Int. Cl.
| | |
|---|---|
| *G01F 1/075* | (2006.01) |
| *G01D 4/00* | (2006.01) |
| *G01F 25/00* | (2006.01) |
| *G01F 15/06* | (2006.01) |

(52) U.S. Cl.
CPC ............... *G01F 1/075* (2013.01); *G01D 4/00* (2013.01); *G01F 15/063* (2013.01); *G01F 15/068* (2013.01); *G01F 25/0007* (2013.01)

(58) Field of Classification Search
CPC ...... G01F 1/075; G01F 15/063; G01F 15/068; G01F 25/0007; G01D 4/00
See application file for complete search history.

(56) References Cited

U.S. PATENT DOCUMENTS

| | | |
|---|---|---|
| 7,041,400 B2 | 5/2006 | Kim et al. |
| 7,385,524 B1 | 6/2008 | Orlosky |
| 8,161,812 B1 | 4/2012 | Fischer |
| 9,041,357 B2 | 5/2015 | Can et al. |
| 2005/0168192 A1 | 8/2005 | Nagase et al. |
| 2007/0163362 A1 | 7/2007 | Wehrs et al. |

(Continued)

FOREIGN PATENT DOCUMENTS

| | | |
|---|---|---|
| WO | 2013156946 A1 | 10/2013 |
| WO | WO2016005164 A1 | 1/2016 |

OTHER PUBLICATIONS

International Search Report and Written Opinion, dated Mar. 11, 2019, in corresponding PCT/US2018/060598.

(Continued)

*Primary Examiner* — Catherine T. Rastovski
(74) *Attorney, Agent, or Firm* — Paul Frank + Collins P.C.

(57) ABSTRACT

A power supply is configured with "smart" technology compatible with functionality on metrology hardware, like gas meters. This technology enables functions on the power supply to retain and generate data. The data may characterize discharge of an energy source, like batteries, that is resident on the power supply. Other data may indicate charge levels that are commensurate with ambient storage and use conditions, for example, to identify effects of "self-discharge" that may occur on the power supply after manufacture but before use on the gas meter. In one implementation, the gas meter may process the data from the power supply to track connection (and disconnection) of the power supply, set life expectancy of the power supply, and manage maintenance on the device as necessary to pre-empt issues that may occur at the end-of-usable life for the power supply, among other favorable functions.

17 Claims, 11 Drawing Sheets

(56) References Cited

U.S. PATENT DOCUMENTS

2007/0271044 A1\* 11/2007 Gutierrez .............. G01F 15/024
                                                    702/45
2012/0112706 A1   5/2012 Henkel et al.
2012/0210708 A1\* 8/2012 Dunn .................. G01F 25/0007
                                                    60/494
2014/0313050 A1  10/2014 Hamilton et al.
2015/0002185 A1   1/2015 McGuire et al.
2017/0230907 A1\* 8/2017 Rose ...................... G01D 4/004
2018/0058907 A1\* 3/2018 Kn ....................... G01F 25/0007
2018/0186244 A1\* 7/2018 Harvey .................. B60L 58/12

OTHER PUBLICATIONS

European Patent Search dated Apr. 23, 2019, in corresponding EP 18205745.5.

\* cited by examiner

US 10,935,401 B2

OPERATING A GAS METER WITH A SMART POWER SUPPLY

BACKGROUND

Metrology hardware enjoys use in many applications. For example, the devices are ubiquitous in fuel gas distribution and related installations that require accurate, reliable metering of fuel gas. These applications often rely on electronics in the device that perform various processing functions, for example, to generate quantifiable values that form the basis for billing or charging customers. Nominally, the electronics require power to perform these functions, often in the form of an on-board power source like a battery or battery pack.

SUMMARY

The subject matter of this disclosure relates to improvements to include a "smart" power supply into metrology hardware. Of particular interest are embodiments with electronics that can cooperate with the "smart" power supply to exchange data. This feature may allow the device to perform diagnostics and related functions pertinent to the power supply. The results may, in turn, be useful for the device to generate alerts, modify component operations, or ensure that maintenance occurs at appropriate times or on schedule to avoid any disruptions that may prevail due to issues with the power supply or with the device itself.

DRAWINGS

Reference is now made briefly to the accompanying figures, in which.

Figure 1:
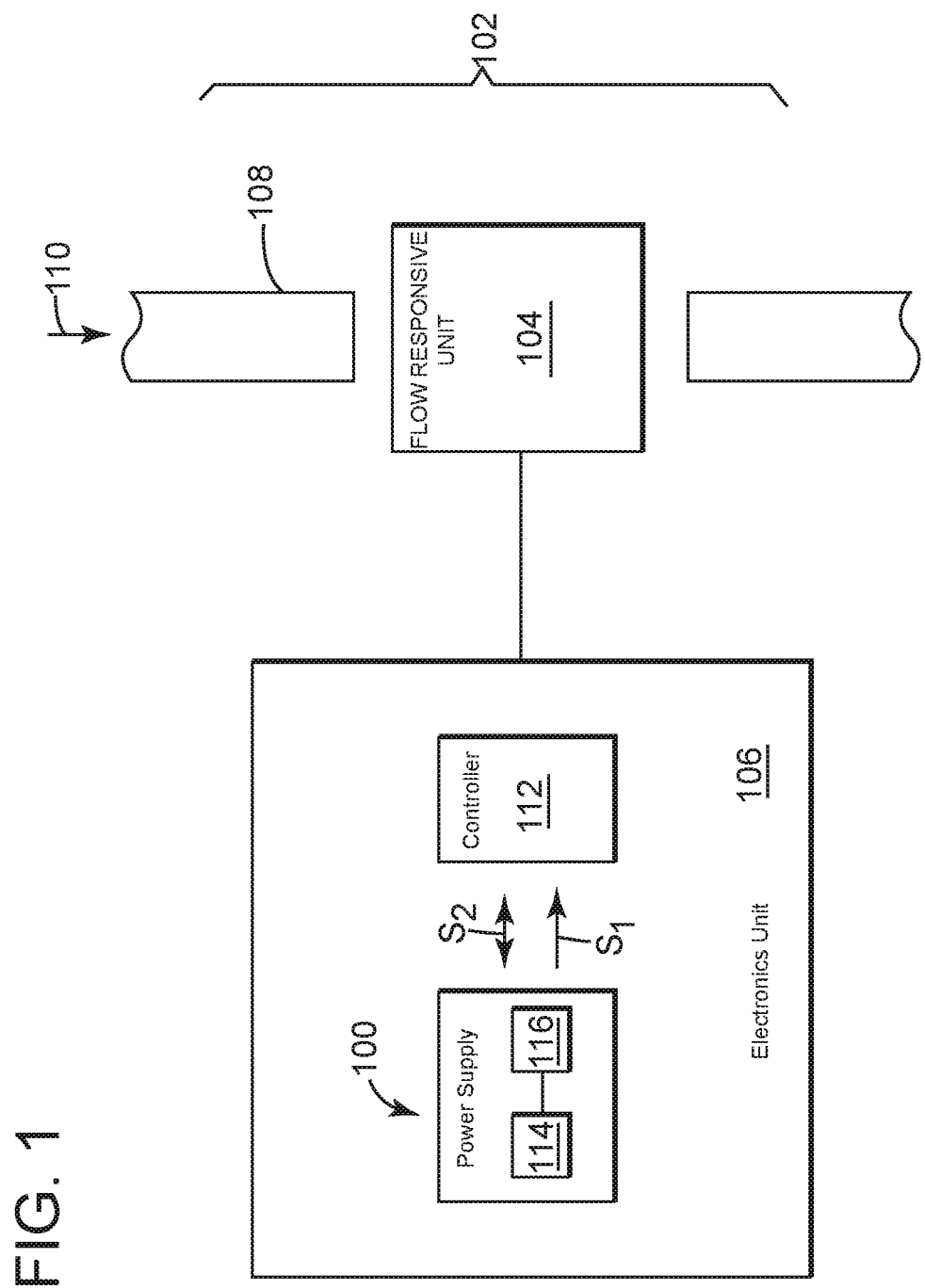
FIG. 1 depicts a schematic diagram of an exemplary embodiment of a system that includes a "smart" power supply and metrology hardware, like a gas meter.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of metrology hardware with an on-board, "smart" power supply. Reference is made throughout to the metrology hardware as a gas meter, but the concepts may apply elsewhere as well. As noted below, the "smart" power supply incorporates technology that permits on-board data collection and analysis, particularly as relates to energy storage cells, namely batteries, found on the device. The gas meter includes a main control, which can exchange data with the "smart" power supply. The main control can process the data to schedule maintenance (to replace the power supply) or to identify more pressing problems that might disrupt operation of the gas meter in the field. Other embodiments are within the scope of the subject matter of this disclosure.

FIG. 1 depicts a schematic diagram of an exemplary embodiment of a power supply 100. This embodiment is shown as part of metrology hardware 102. For fuel gas distribution, metrology hardware 102 is often referred to as a "meter" or "gas meter." Examples of the gas meter 102 may include a pair of measuring units (e.g., a flow responsive unit 104 and an electronics unit 106). The flow responsive unit 104 may couple with a conduit 108 that carries material 110, for example, fuel gas (used in the discussion that follows). Material 110 may also embody other fluids (e.g., liquids and gasses), although the device may work with solids and solid/fluid mixes as well. The electronics unit 106 includes a main controller 112. In one implementation, the power supply 100 may include an energy source 114 that couples with circuitry 116, which itself connects or couples with the main controller 112 to exchange signals (e.g., a first signal $S_1$ and a second signal $S_2$). The signals $S_1$, $S_2$ may correspond with power and data (e.g., current, voltage, etc.), respectively.

Use of the gas meter 102 may generate data that quantifies measured parameters for material 110. For example, measuring units 104, 106 may interact with one another to measure and quantify volumetric flow rate of the flow of material 110 in conduit 108. The flow responsive unit 104 may include mechanics like impellers, turbines, and diaphragms that interact with the flow of material 110. Alternative configurations may, however, leverage sensors (e.g., temperature sensors, pressure sensors, etc.) or technology (e.g., ultrasonic) that reside proximate flow of material 110. These devices may generate signals in response to local characteristics of material 110. The electronics unit 106 typically includes electronics to generate the value for the volumetric flow rate. Exemplary electronics may form some type of non-contact interface to translate movement of the mechanics (e.g., rotation of the impellers) into electrical signals. Other electronics may generate these signals from various processing functions of "sensor signals," noted above. In both cases, the resulting electronic signals may form the basis to bill customers for use of fuel gas.

The main controller 112 may be configured as part of the electronics in the electronics unit 106. These configurations may include circuitry outfit to operate as the central "brains" of the gas meter 102. This circuitry may be responsible for data processing functions that occur on the device. As noted above, these functions may generate the value for volumetric flow rate. Other functions may generate an output for display (on, for example, a screen) or for use in applications that invoice customers, as noted herein.

The energy source 114 may be configured to provide power to operate the electronics unit 106. These configurations may store and retain energy in one or more batteries or, more generally, energy storage "cells." Discharge from the cells, as power signal $S_1$, for example, may energize electronics, sensors, communication devices (e.g., wireless antenna), and various other functional devices on the electronics unit 106. Multiple cells may benefit the design to avoid disruption in the power supply. Examples of batteries and cells may be rechargeable, which may prove useful to take advantage of energy generation or harvesting found at or proximate the gas meter 102. This feature may further reduce maintenance needs at the gas meter 102.

The circuitry 116 may provide functionality for operations on the power supply 100. Topology may leverage computing components (like processor(s) and memory) that can execute software programs to enable functions on the device. Predominantly, these functions may regulate power draw or discharge (as the power signal $S_1$) to the electronics unit 106. Components may include circuits and bus structure to direct power from the cells individually or from more than one of the cells at a time, as desired. This feature may configure the power supply 100 to meet longevity requirements or power demands on the electronics unit 106. In one implementation, the circuitry 116 may provide functions to enhance performance of the power supply 100, either independently or in conjunction with functions on the main controller 112, typically by facilitating bi-directional exchange of data (as the data signal $S_2$). This "smart" technology may enable traceability, monitor performance of the cells, quantify power diagnostics for the gas meter 102, and provide safety measures so the power supply 100 can work on the gas meter 102 in hazardous areas.

Traceability is useful to track data that reflects use of the power supply 100 or its components. This data may indicate connection or disconnection of the power supply 100 with the electronics unit 106. It may prove useful to also register connection or disconnection of the cell or cells with the circuitry 116 as well. In this regard, the circuitry 116 may store information that uniquely identifies on or both of the cells (individually) or the power supply 100. Examples of these "identifiers" may include serial numbers, cyclic redundancy check (CRC) numbers, check sum values, hash sum values, or the like. This information may embed into memory the circuitry 116 at the time of manufacture. Benefit may be had to write the information to memory that is configured to prevent changes or tampering, essentially "hardwiring" the identifiers (and other information) to the respective device.

Cell performance may track metrics to provide a picture of cell or source "health." Generally, values for these metrics may relate to "output" parameters, like output voltage and output current from the cells. "Physical" parameters may relate to temperature or material properties of the cells. "Ambient" parameters may describe temperature, relative humidity, and pressure of the environment proximate the cells. Often the circuitry 116 may aggregate this information in memory, preferably on a rolling or real-time basis over time. The circuitry 116 may also process the information to generate data, as the data signal 116. The electronics unit 106 may generate an output in response to the data signal $S_2$, for example, that inform an end user (e.g., a technician) about the health of the power supply 100. This feature may ensure that the power supply 100 continues to meet power demands or requirements for the electronics unit 106.

Power diagnostics may track use or consumption of power at the electronics unit 106. For example, the circuitry 116 may analyze power output from the power supply 100 to meet demand on the electronics unit 106. This analysis may look for indicators (e.g., peaks and valleys) that describe abrupt changes in power consumption by the electronics unit 106. The circuitry 116 may, in turn, generate the data signal $S_1$ with data to describe these indicators. The electronics unit 106 may associate the indicators to operational problems that require attention, but might not be readily apparent or traceable on or by the gas meter 102.

Safety considerations may allow the gas meter 102 to meet standards of operation for hazardous areas. These standards may correspond with "intrinsically-safe circuit designs." For example, the circuitry 116 may be effective to power or "energy" limit one or both of the signals $S_1$, $S_2$, preferably when the signals $S_1$, $S_2$ enter areas of the gas meter 102 that are not explosion-proof. In one implementation, the circuitry 116 can ensure signals $S_1$, $S_2$ are at low voltages and low currents to avoid sparks or arcing that could ignite or cause ignition of flammable fuel gas.

Figure 2:
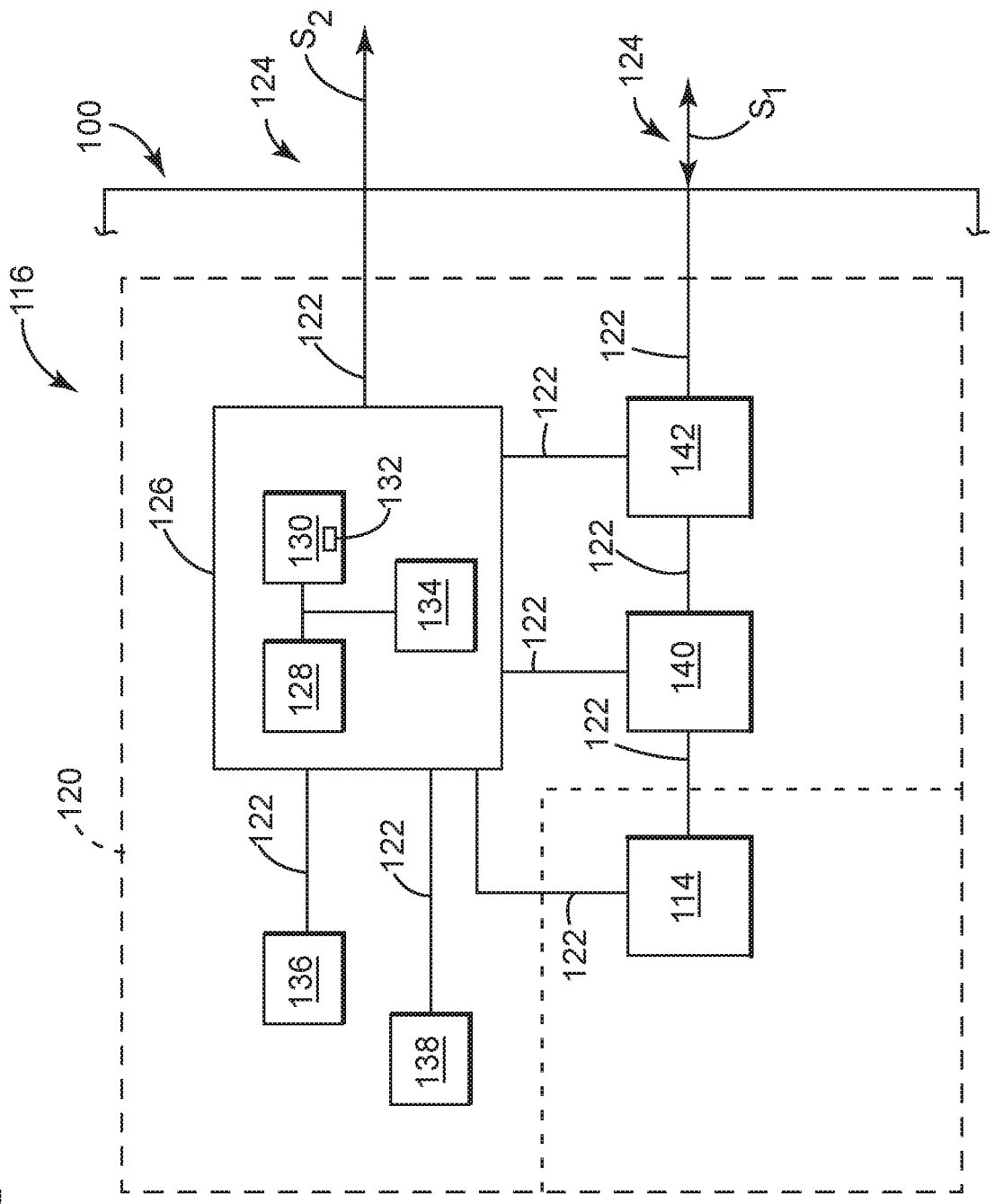
FIG. 2 depicts a schematic diagram of an example of the "smart" power supply of FIG. 1.

FIG. 2 depicts a schematic diagram of an example of base-level topology for components of the power supply 100 of FIG. 1. The circuitry 116 may embody an operative circuit board 120, preferably a substrate like a printed circuit board (PCB) or semiconductor device. The circuit board 120 may incorporate a bus structure 122 to exchange signals internal and external to circuitry 116. The bus structure 122 may connect with electrical ports 124, for example, to exchange signals $S_1$, $S_2$ with the electronics unit 106. Standard or proprietary communication buses including SPI, I$^2$C, UNI/O, 1-Wire may be useful for this purpose (or, even, one or more like serial computer buses known at the time of the present writing or developed hereinafter). The circuitry 116 may include a main processing circuit 126 having computing components like a processor 128 coupled with a storage memory 130 that stores data 132 thereon. Computing components 128, 130 may integrate together as a microcontroller or reside separately as discrete components. Examples of the data 132 can include executable instructions (e.g., firmware, software, computer programs, etc.) and "information" about the device. The main processing circuit 126 may also have driver circuitry 134 that couples with the processor 128 and with other components to facilitate component-to-component communication. These components may include sensing circuitry 136, timing circuitry 138, measurement circuitry 140, and output control circuitry 142.

The main processing circuit 126 may be configured to operate the power supply 100. This device may have functionality to process signals (like data signal $S_2$) from the main controller 112, preferably in digital format. Other functionality can generate the data signal $S_2$ or other operative outgoing signals, such as those used to instruct operation of other components, like the output control circuitry 142. Data processing functions may be important to process signals (e.g., the data signal $S_2$) that originate from the main controller 112. These "incoming" data signals may include data, possibly in the form of instructions or like information that is pertinent to or can influence the functionality of power supply 100.

The sensing circuitry 136 may be configured to provide data that defines parameters on the power supply 100. These configurations may include one or more sensing elements or probes that, effectively, generate signals in response to stimuli. Examples include thermistors, thermocouples, transducers, piezo-resistive gauges, and like devices. These devices may disperse on or in proximity to the source 114, as well as in other on-board locations that may provide data relevant to operation of the power supply 100.

The timing circuitry 138 may be configured to maintain time to synchronize measurements or calculations on the power supply 100. These configurations may operate as a real-time clock that integrates as an "integrated circuit" into circuitry 116. Generally, this integrated circuit may embody a micro-power chip with an oscillator that counts time. The chip may couple with its own power supply, often a lithium battery with extensive lifespan (e.g., >2 years). A counter may couple with the oscillator. The counter processes signals from the oscillator to output time increments, preferably at accuracy that comports with national standard clocks.

The measurement circuitry 140 may be configured to measure performance of the power supply 100 and its cells. These configurations may embody circuitry responsive to voltage or current fluctuations. This circuitry may include a sensor, for example, a resistor. Other components may generate a signal that reflects voltage drop across the resistor. The main processing circuit 126 may use this signal to evaluate performance, as desired.

The output control circuitry 142 may be configured to regulate the power signal $S_1$ upstream of the electronics unit 106. These configurations may include circuits that interpose between the source 114 and the electrical ports 124. Signals from the main processing circuit 126 may instruct operation of these circuits to allow or prevent the power signal $S_1$ at the electrical ports 124.

Figure 3:
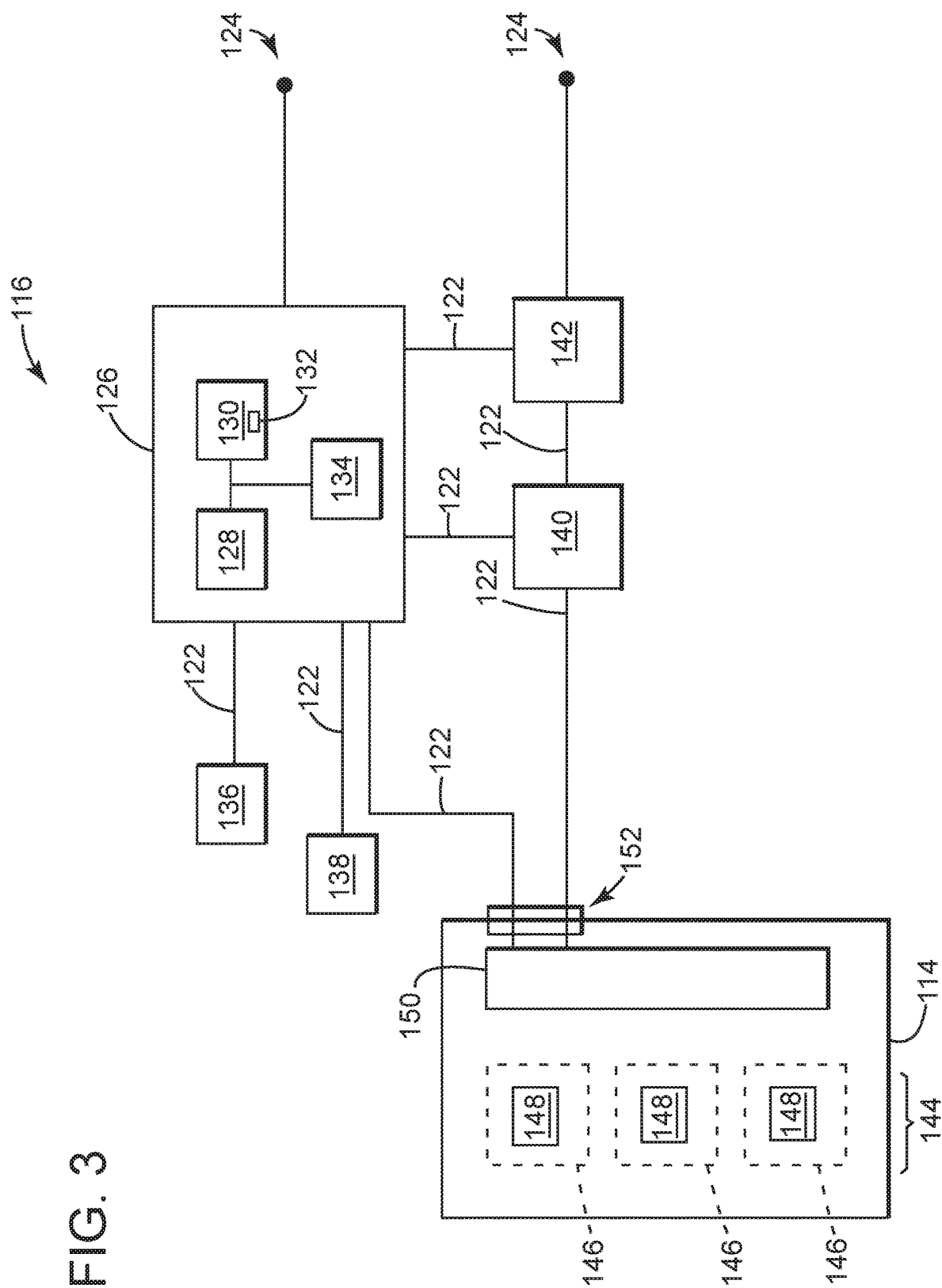
FIG. 3 depicts a schematic diagram an example of the "smart" power supply of FIG. 1.

FIG. 3 depicts an example of the topology of FIG. 2 with an example of the source 114. This example has a cell network 144 with ports 146 to receive energy storage cells 148 therein. Construction of the ports 146 may provide appropriate electrical connections to receive power (e.g., current, voltage, etc.) from the cells 148. These connections may embody "pluggable" sockets with conductive pins or receptacle for the same. Complimentary connectors on the cells 148 may, in turn, allow the cells 148 to readily remove and replace from the cell network 144. This feature can simply manufacture and service in the field. As shown, the ports 146 may couple with a power distribution circuit 150, itself coupled with driver circuitry 134 of the main processing circuit 126 and with the measurement circuitry 140. The power distribution circuit 150 may connect the ports 146 to a central output 152. This feature may couple the ports 144 with the measurement circuitry 140 and, in turn, with electrical ports 124. In use, the circuit 148 may be able to couple the ports 144 to the central output 152, either individually or in groups. Appropriate section or combination of the cells 148 may correspond with instructions from the main processing circuit 126, possibly in response to demand (or changes thereof) at the electronics unit 106.

Figure 4:
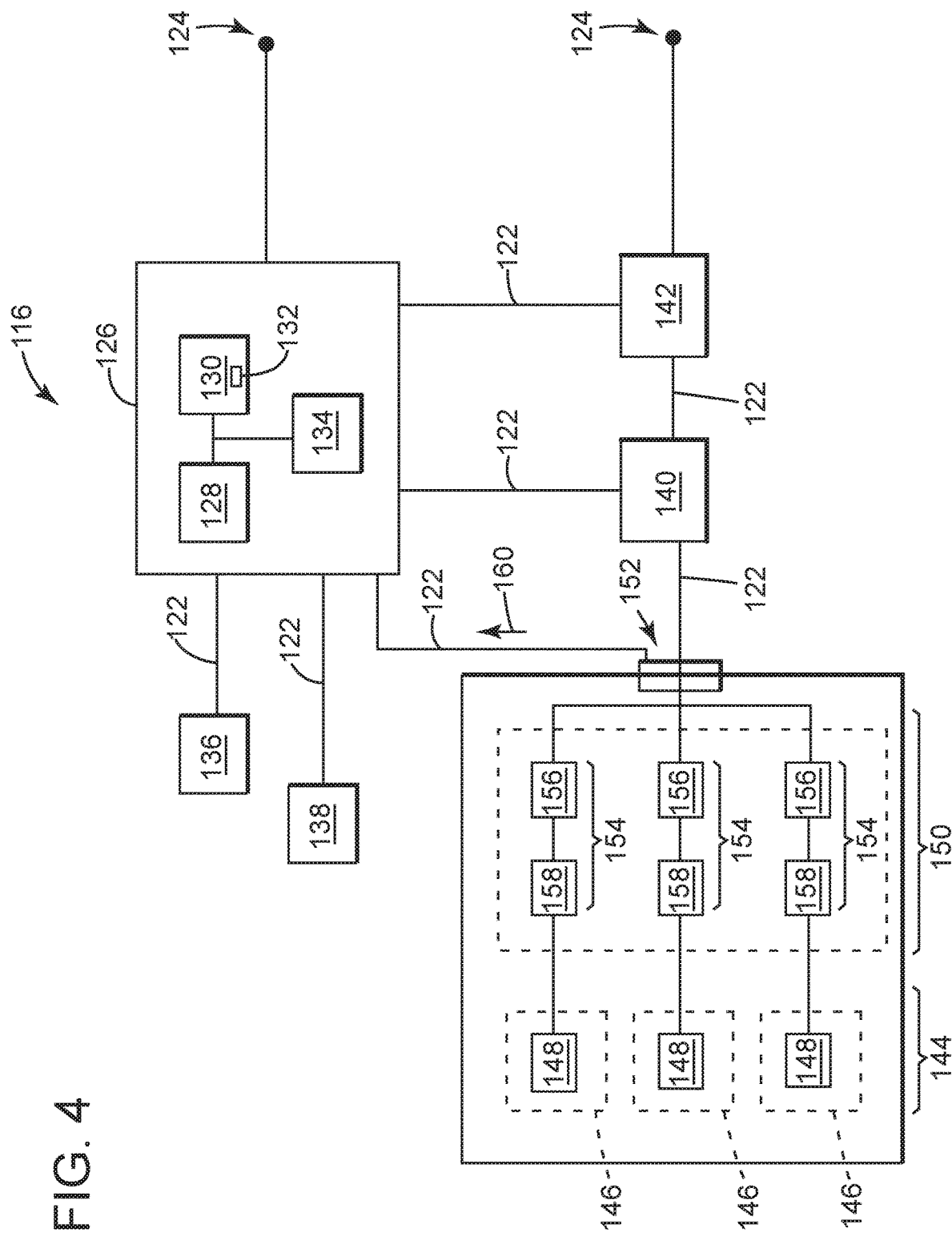
FIG. 4 depicts a schematic diagram an example of the "smart" power supply of FIG. 1.

FIG. 4 depicts the topology of FIG. 2 with an example of the power distribution circuit 150. This example includes switchable circuits 154, one each coupled with the ports 146. The switchable circuits 154 may include switches 156 and measurement sub-circuits 158. In one implementation, the sub-circuits 158 may generate signals 160 that reflect operating parameters for the cells 148, individually. The main processing circuit 126 may use the signals 160 to monitor the cells 148 for performance issues or to maintain other metrics as desired.

Figure 5:
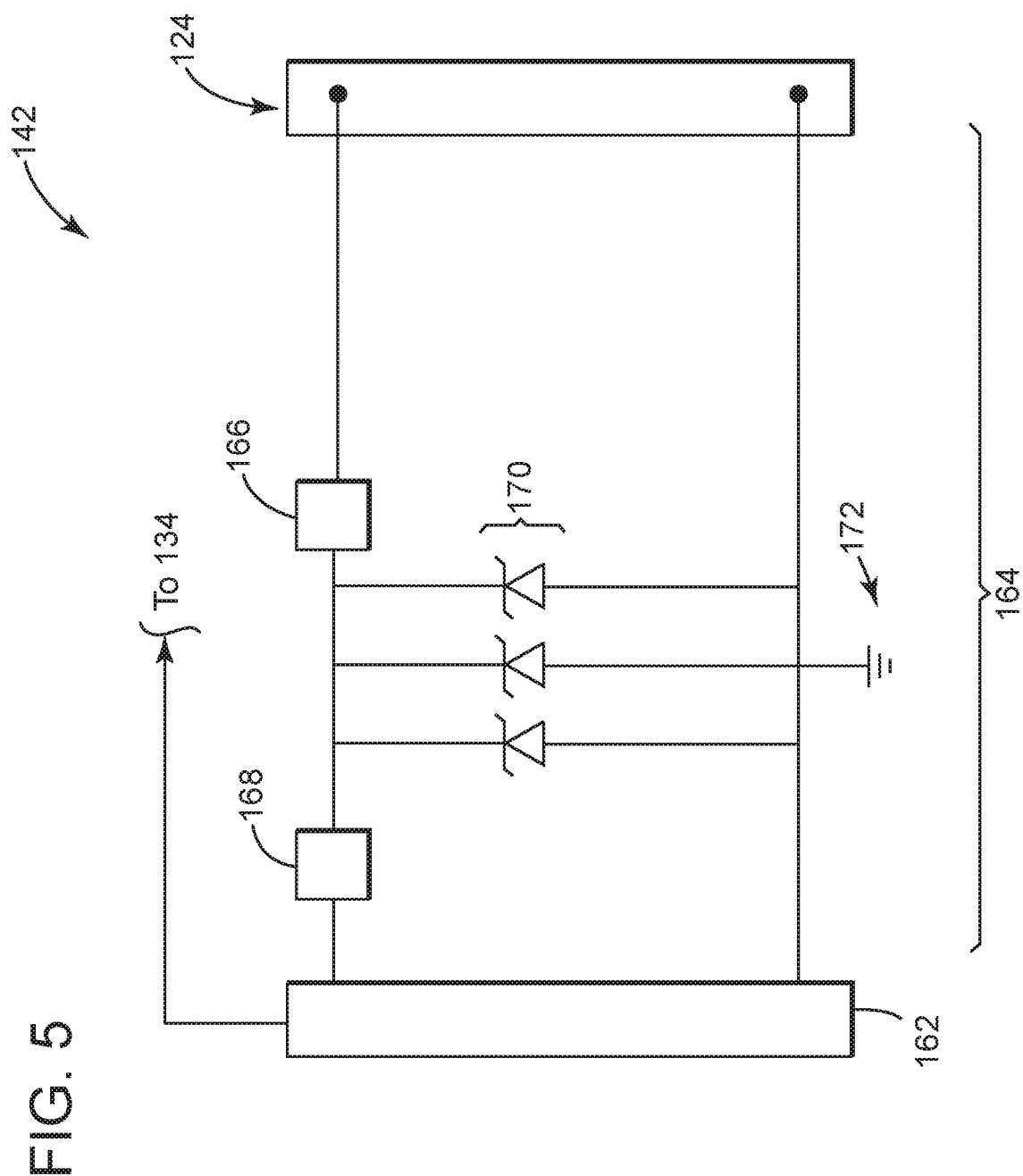
FIG. 5 depicts a schematic digram of an example of output limiting circuitry for use on the "smart" power supply of FIG. 1.

FIG. 5 depicts a schematic digram of topology for an example of the output control circuitry 142. This example includes a switch 162 and a barrier circuit 164. The switch 162 may couple with the driver circuitry 134. The barrier circuit 164 may be configured to couple with the electric ports 124, typically a two-wire interface that "exits" the circuit board 120. This configuration may include discrete devices (e.g., a fuse 166 and a resistor 168). A diode device 170 couples the discrete devices 166, 168 to a ground 172. Examples of the diode device 170 may include one or more zener diodes, but other discrete devices may work as well. In operation, fault voltage across the barrier circuit 164 will cause current to flow across the diode device 170 to the ground 172. The grounded current causes the fuse 166 to open, thus limiting current available to the electronics unit 106 via the electrical ports 124.

Figure 6:
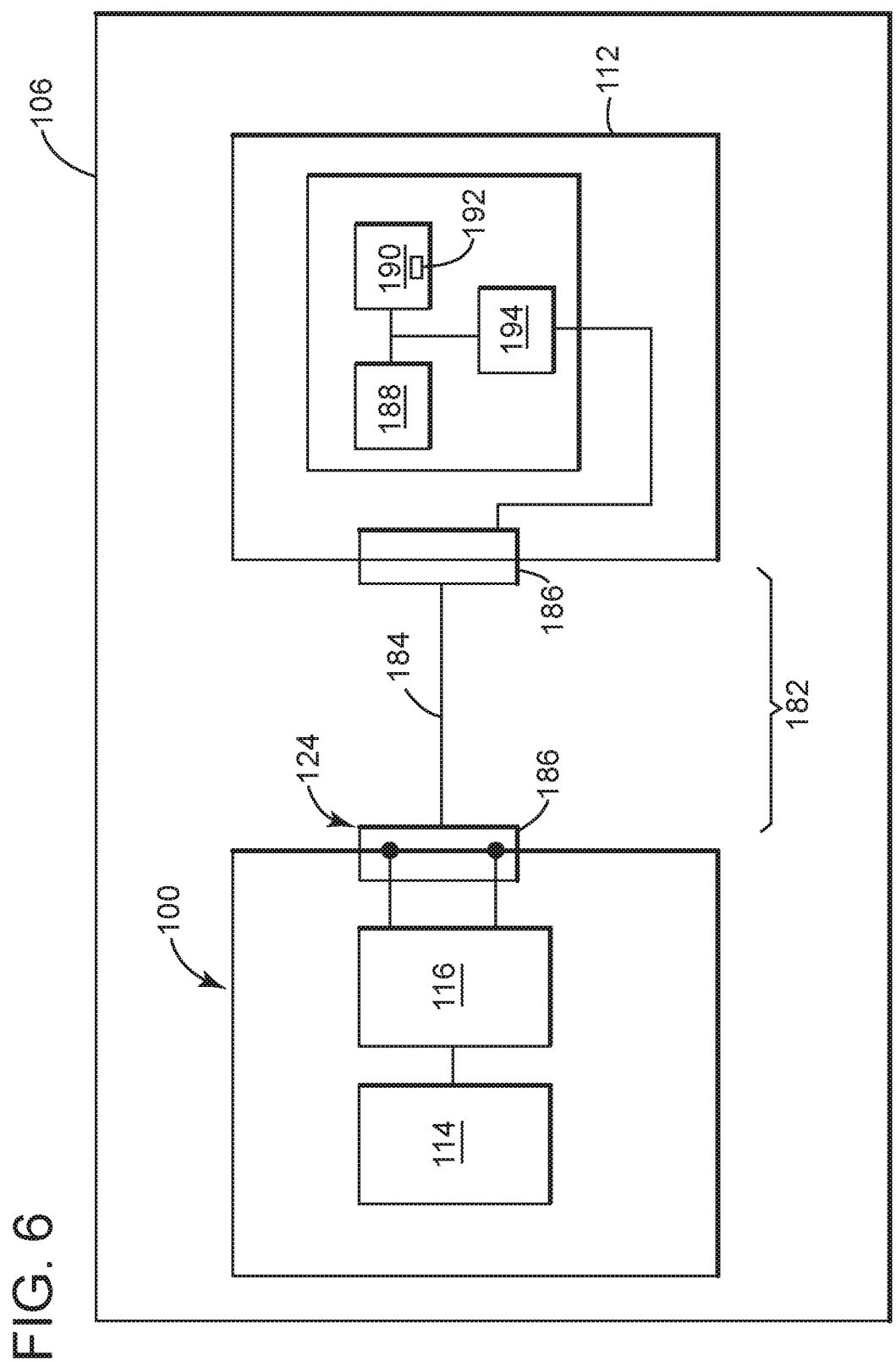
FIG. 6 depicts a schematic diagram of an example of the gas meter of FIG. 1 that includes the "smart" power supply.

FIG. 6 depicts a schematic diagram of an example of base-level topology for the gas meter 102 of FIG. 1. This topology may benefit from a connective interface 182 that permits the power supply 100 to "replace" or "swap" out of the electronics unit 106, as desired. The connective interface 182 may include a cable assembly 184 with conductive members (e.g., wires or cables) that terminate at connectors 186 on its ends. Examples of the connectors 186 may compliment connectors found on the electronics unit 106 and at the electrical ports 124 of the circuitry 112. It is also possible that one of the ends of the conductive member is "hardwired" to respective circuitry on either of these devices. Techniques like direct soldering or wire bonding may be useful for this purpose. The main controller 112 may include various components including a processor 188 that couples with memory 190 that retains data 192 thereon. The device may also include driver circuitry 194, which couples with a power connector 196.

Figure 7:
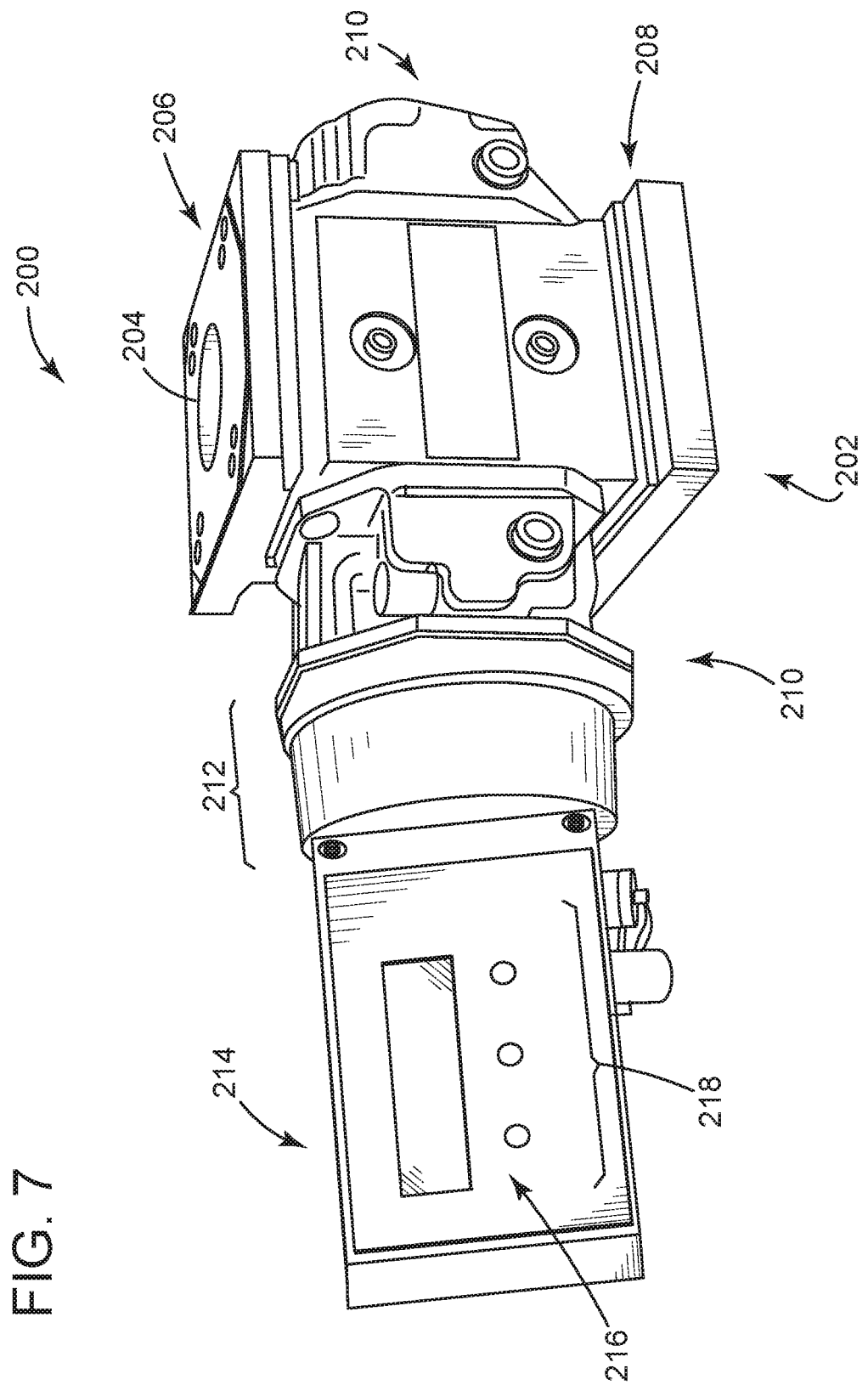
FIG. 7 depicts a perspective view of exemplary structure for the gas meter of FIG. 1.

FIG. 7 depicts a perspective view of exemplary structure 200 for the gas meter 102 of FIG. 1. The structure may include a meter body 202, typically of cast or machined metals. The meter body 202 may form an internal pathway that terminates at openings 204 at flanged ends (e.g., a first flanged end 206 and a second flanged end 208). The ends 206, 208 may couple with complimentary features on a pipe or pipeline to locate the meter body 202 in-line with conduit 108 (FIG. 1). As also shown, the meter body 202 may have a covers 210 disposed on opposing sides of the device. The covers 210 may provide access to the flowpath, where a pair of impellers resides so as to have access to the flow of material that passes through openings 204. One of the coves 210 may feature a connection 212, possibly flanged or prepared to interface with the electronics unit 106. In this regard, the structure may include an index housing 214 having an end that couples with the connection 212. The index housing 214 may comprise plastics, operating generally as an enclosure to contain and protect electronics including the power supply 100 and circuit board 120 (discussed above). The index housing 214 may support a display 216 and user actionable device 218, the latter being used to interface with interior electronics to change the display 216 or other operative features of the device.

Figure 8:
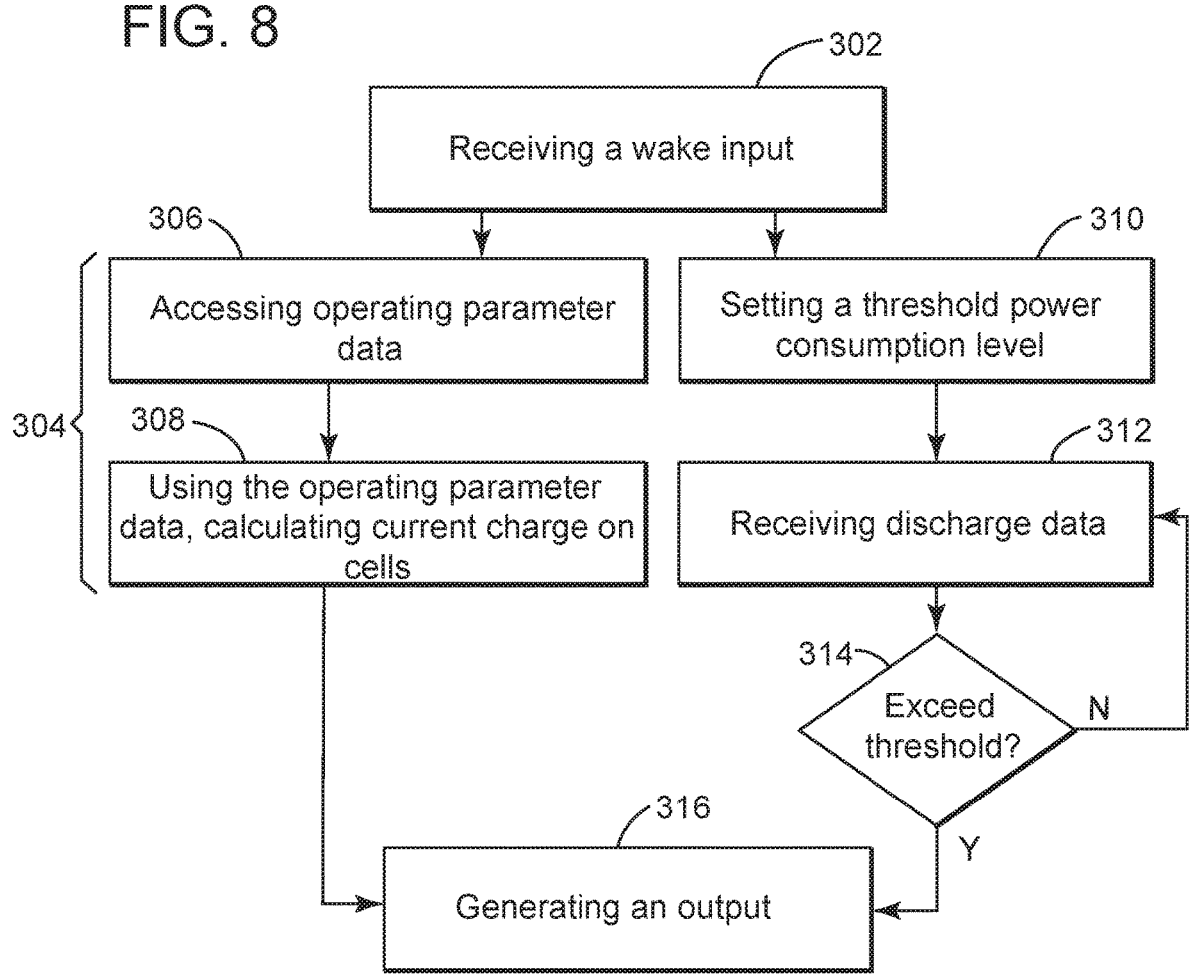
FIG. 8 depicts a flow diagram of an exemplary method for operating the "smart" power supply of FIG. 1.

FIG. 8 illustrates a flow diagram of an exemplary embodiment of a method 300 for functionality on-board the power supply 100. This diagram outlines stages that may embody executable instructions for one or more computer-implemented methods and/or programs. These executable instructions may be stored on the main processing circuit 126 as firmware or software. The stages in this embodiment can be altered, combined, omitted, and/or rearranged in some embodiments.

Operation of the method 300 may enable diagnostics on-board the power supply 100. The method 300 may include, at stage 302, receiving a "wake" input. The method 300 may also include, at stage 304, performing diagnostics on the power supply. These diagnostics may include, at stage 306, accessing operating parameter data and, at stage 308, using the operating parameter data, calculating current charge on the cells. The diagnostics may also include, at stage 310, setting a power consumption threshold level. The method 300 may further include, at stage 312, receiving power discharge data and, at stage 314, determining whether the discharge data exceeds the power consumption threshold level. The method 300 may also include, at stage 316, generating an output to convey data that relates to the diagnostics (at stage 304).

At stage 302, the main processing circuit 126 may receive the input from the main controller 112 of the electronics unit 106. This input may correspond to a signal (e.g., data signal $S_2$) from the main controller 112, possibly that originates in response to or at the time the power supply 100 connects with the electronics unit 106. This signal may transmit data, information, or instructions that the main processing circuit 126 can process to set operation of the power supply 100.

At stage 304, the main processing circuit 126 may perform diagnostics that are useful to manage operation of the power supply 100 or the gas meter 102, generally. The incoming signal from the main controller 112, for example, may cause the main processing circuit 126 to perform some type of self-diagnostic functions. Examples of these functions may evaluate discharge (or "self-discharge") that occurs naturally in the device. This self-discharge may reduce overall stored energy (or "charge") on the device. In one implementation, the main processing circuit 126 can evaluate self-discharge from a date of manufacture to a date of installation into the electronics unit 106. Other diagnostics may be useful to characterize power demands of the electronics unit 106, as well.

At stage 306, the main processing circuit 126 may access operating parameter data for purposes of discharge evaluation. This operating data may include values for temperature, relative humidity, and like ambient conditions that prevail at or proximate the power supply 100 or its internal components (e.g., cells, circuitry, etc.). In addition, the operating data may include a time value, for example, time spent in storage (e.g., "shelf-life") prior to use in the gas meter 102. These values may be stored on memory 130 in a persisting database or like database structure. In this regard, the method 300 may include other stages for periodically sampling data from sensing circuitry 136 and writing the data to memory 130. Practically, these stages would require little power from the cells when dormant as inventory.

At stage 308, the main processing circuit 126 can calculate a value for the current charge on the cells. This value may correlate to a manufacturer "model" that is useful to accurately predict static discharge of the cells. Models of this type may correspond with particular types, models, or serial number of the cells found in the power supply 100. It follows then that additional stages may be required to store and recall any appropriate look-up tables with data or other algorithms that will expedite the analysis of the cells. Notably, self-discharge will continue over the useable life of the cells. It follows, then, that diagnostics that relate to self-discharge may continue after the power supply 100 enters in to use on the electronics unit 106. In this regard, the method 300 may includes stages to continue to perform stages 306, 308 so as to maintain or update data to the main controller 112. This data is beneficial so that the main controller 112 can revise, if necessary, its analysis and determination of the life expectancy of the power supply 110. In turn, the main controller 112 can update maintenance scheduling to accelerate (or decelerate) the time schedule or time frame to replace the power supply 100, thus avoiding the need to expend cost and time in labor to perform maintenance until it is necessary to maintain proper operation of the gas meter 102.

At stage 310, the main processing circuit 126 may set a value for the power consumption threshold level. This value may quantify the designed power consumption for the electronics unit 106, which may be pre-determined and stored (or "hardwired") into the main controller 112 or the main processing circuit 126 of the power supply 100. In operation, the design power consumption will set a threshold level of power that the electronics unit 106 is likely to draw under normal operating conditions.

At stage 312, the main processing circuit 126 may receive data from the measurement circuitry 140. The data may define discharge from the power supply, for example, as the power signal $S_1$. This stage may include one or more stages for sampling the data from the measurement circuitry 140 and storing the data on memory 130. But while real-time polling to create a continuous stream of data may be advantageous, this disclosure does contemplate that sampling may occur at pre-defined intervals to limit or reduce demand on data storage space. Also, it may benefit the main processing circuit 126 to "learn" the power consumption value. The method 300 may include stages, for example, to monitor, sample, and store data from the measurement circuitry 140 that reflects power demand by the electronics unit 106 over time. Additional stages for analysis of this data, like statistical analysis, may arrive at the power consumption threshold level as an average or median based on in-field demands of the electronics unit 106.

At stage 314, the main processing circuit 126 may determine whether power demands have changed at the electronics unit 106. Discharge values that exceed (or are below) the power consumption threshold level, for example, may indicate that demand has change to the detriment of operation of the electronics unit 106. Failure of components on the electronics unit 106, for example, may cause the electronics unit 106 to increase or decrease demand on the power supply.

At stage 316, the main processing circuit 126 may generate signal $S_2$ to convey the value for the diagnostics to the main controller 112. The signal $S_2$ may be in digital format, although analog may suffice as well. For some diagnostics, it may benefit the electronics unit 106 for the signal $S_2$ to convey an alert or indicator that relates to the specific diagnostic value (e.g., change in discharge/demand). The current charge, on the other hand, may best be conveyed by value so that the main controller 112 can perform appropriate operations. In one implementation, these operations may cause the case meter to enter into a safe mode or low power mode, that preserves energy to extend the life of the batteries until appropriate remediation occurs on the device.

Figure 9:
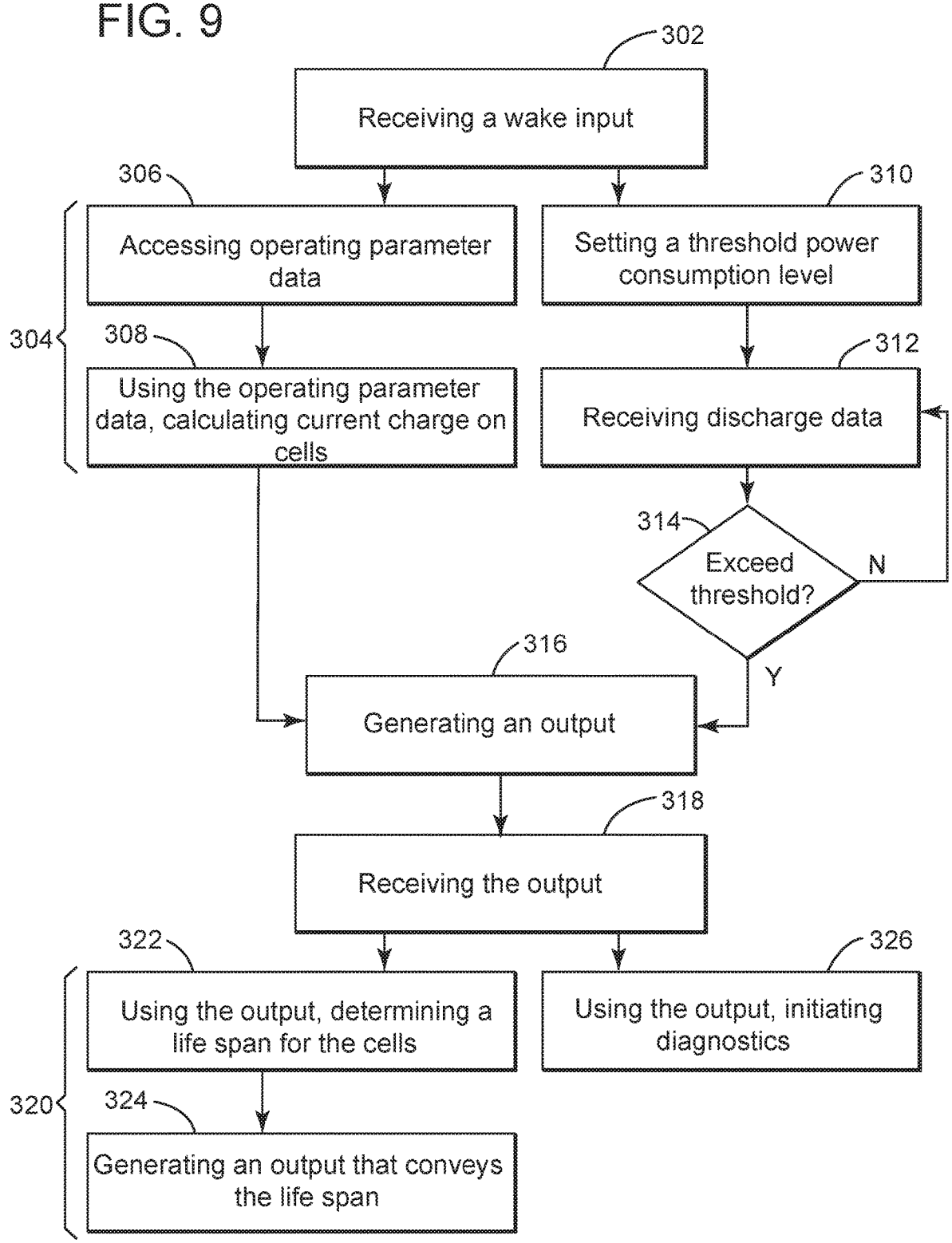
FIG. 9 depicts a flow diagram of an example of the method of FIG. 8 to communicate between the "smart" power supply and other components of the gas meter.

FIG. 9 depicts a flow diagram of an example of the method 300 of FIG. 8 to include some of the operations that may prevail at the electronics unit 106. The method 300 may include, for example, at stage 318, receiving the output (e.g., signal $S_2$), and at stage 320, initiating self-corrective actions. These self-corrective actions may include, at stage 322, using the current charge to determine the life span of the power supply or, at stage 324, performing internal diagnostics that evaluate operation of system components. The method 300 may further include, at stage 326, generating an output that transmits data remotely.

At stage 318, the main controller 112 may receive data from the main processing circuit 126 on the power supply 100. This data, as noted above, may include values for one of the operating characteristic above, or others as discussed or contemplated herein. Processing of the data may initiate functionality on the main controller 112.

At stage 320, the main controller 112 may take some self-corrective action. These actions may correspond with an evaluation of the operability of the power supply 100. This evaluation may, in turn, qualify (or quantify) performance of the power supply 100, for example, as relates to performance of the electronics unit 106. Reductions in performance or perceived performance (like loss of charge) may cause the main controller 112 to move to a low power mode, for example, until appropriate changes occur at the power supply 100.

At stage 322, the main controller 112 may determine the life span of the power supply 100. This stage may rely on data stored on-board that defines power requirements for the electronics unit 106. This stage may also include stages for extrapolating life span based on, at least in part, the current charge the operative power requirements.

At stage 324, the main controller 112 may perform internal diagnostics. These internal diagnostics may coincide with data from the power supply that shows operation deviates from the power demand threshold. This stage may include stages that can diagnose in-operative or improperly-operative components to identify the root cause of the change in power demand. In one implementation, the stages may include stages for limiting or ceasing operation of the gas meter 100 or flow of material 110 so as to avoid erroneous billing of the customer.

At stage 326, the main controller 112 may generate the output remote from the device. This output may operate as an alert or like indicator that conveys information about operation of the electronics unit 106. The information may inform the end user that issues prevail on the device, whether immediately detrimental to operation of the gas meter 100 or cause for concern or maintenance during it operative lifespan. For example, information may change potential maintenance scheduling to accelerate power supply 100 change over because the lifespan of the existing power supply 100 is shorter than the expected lifespan for the gas meter 100.

Figure 10:
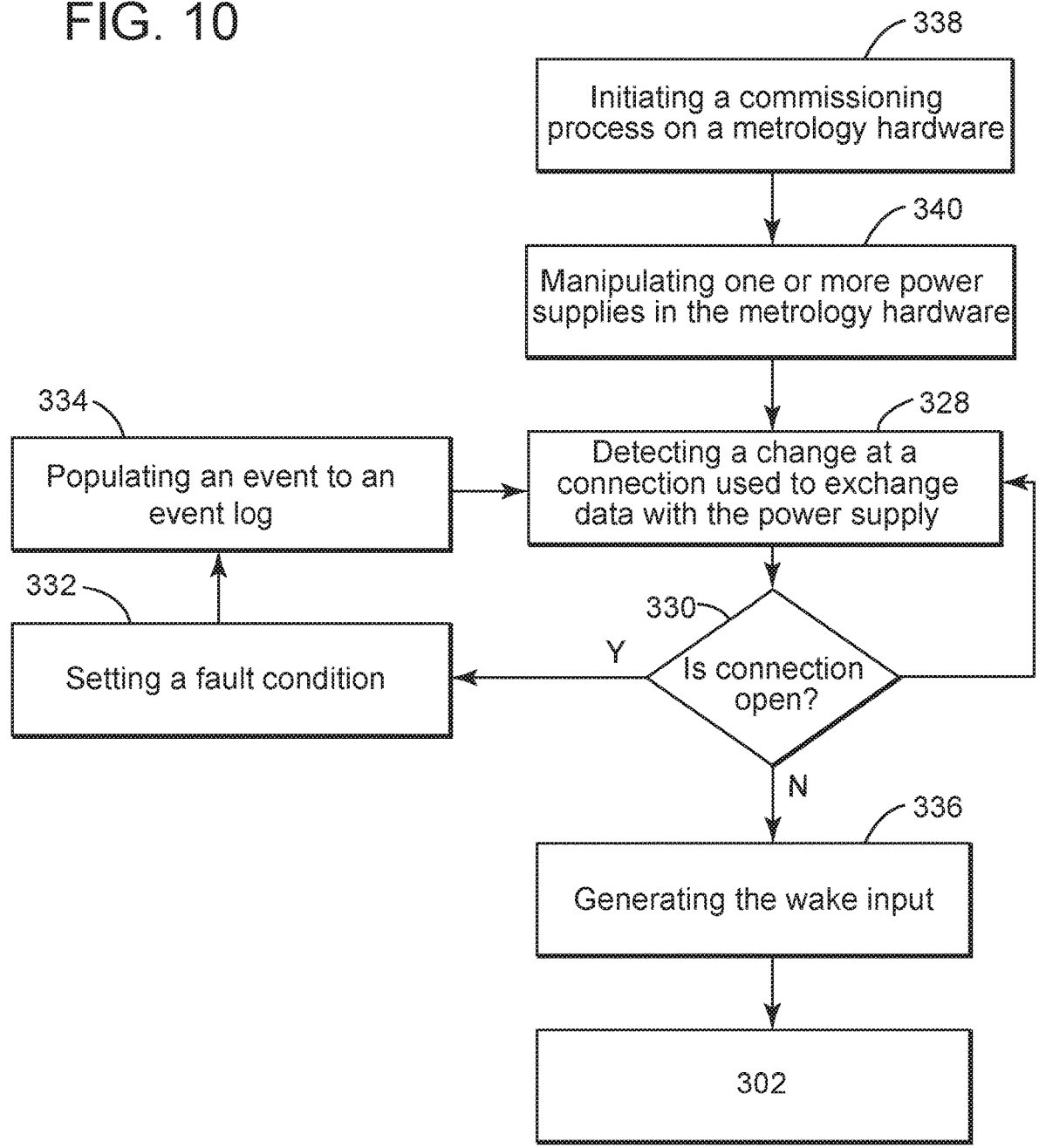
FIG. 10 depicts a flow diagram of an exemplary method for operating the gas meter of FIG. 1.

FIG. 10 illustrates a flow diagram of an example of the method 300 of FIG. 9. In this example, the method 300 may include, at stage 328, detecting a change in state at a connection used to exchange data with a power supply and, at stage 330, determining the state of the connection. If the connection is open, the method 300 may continue, at stage 332, setting a fault condition and, at stage 334, populating an event to an event log. The method 300 may also continue to detect the change at the connection (at stage 328). If the connection is closed, the method 300 may continue, at stage 336, with generating the wake input for the power supply as discussed in connection with FIG. 7 above. In one implementation, the method 300 may include one or more stages that relate to interaction by an end user (e.g., a technician) to perform maintenance, repair, upgrades, and assembly or like task to modify structure of a gas meter. These stages may include, at stage 338, initiating a commissioning process on the gas meter and, at stage 340, manipulating one or more power supplies on the gas meter.

At stage 328, the electronics unit 106 detects the change in state at the connection. As noted above, the change may correspond with a signal from a "port" on the electronics unit 106, possibly a connector or connecting device that connects the power supply 100 to the electronics unit 106. The signal may correspond with a pin on the connector. Values for this signal may correspond with a high voltage and a low or zero voltage, one each to indicate that the pin on the connector is in use or not in use with respect to the connected hardware. The signal could also arise in response to updates in executable instructions on the metrology hardware. In one implementation, the electronics unit 106 may include one or more stages for initiating a "handshake" in response to the signal. This handshake may cause the main controller 112 to transmit data to the main processing circuit 126 on the power supply 100. In return, the main processing circuit 126 may retrieve and transmit identifier data to the electronics unit 106, as noted more below in connection with FIG. 10.

At stage 330, the electronics unit 106 determines the state of the connection. This stage may include one or more stages that compare the signal from the port to a look-up table or other threshold that indicates the state of the port. Open ports may indicate that hardware has been removed or is currently unavailable. On the other hand, closed ports may indicate that hardware is available to commence in situ commissioning process.

At stage 338, the electronics unit 106 initiates the commissioning process. This stage may include one or more stages for receiving an input. Examples of the input may arise automatically, for example, based on a timer or other component internal to the metrology hardware that automatically polls the power supply 100. In one implementation, the input may arise externally from a remote device (e.g., computer, laptop, tablet, smartphone) that connects with the gas meter 102. This input may correspond with a technician plugging or unplugging the power supply 100 from the electronics unit 106 (at stage 340). The external input may be necessary to allow the electronics unit 106 to operate with any new or different power supply. Data of the input may include a user name and password. In one example, the method 300 may include stages to create an event (at stage 334) that corresponds with the manipulation of the power supply 100. Notably, stages 332, 334 may occur on the power supply 100 as well. This feature may be beneficial to create historical records of the device for purposes of traceability and other diagnostics, for example, performance driven analysis after the power supply 100 is removed from the electronics unit 106.

Figure 11:
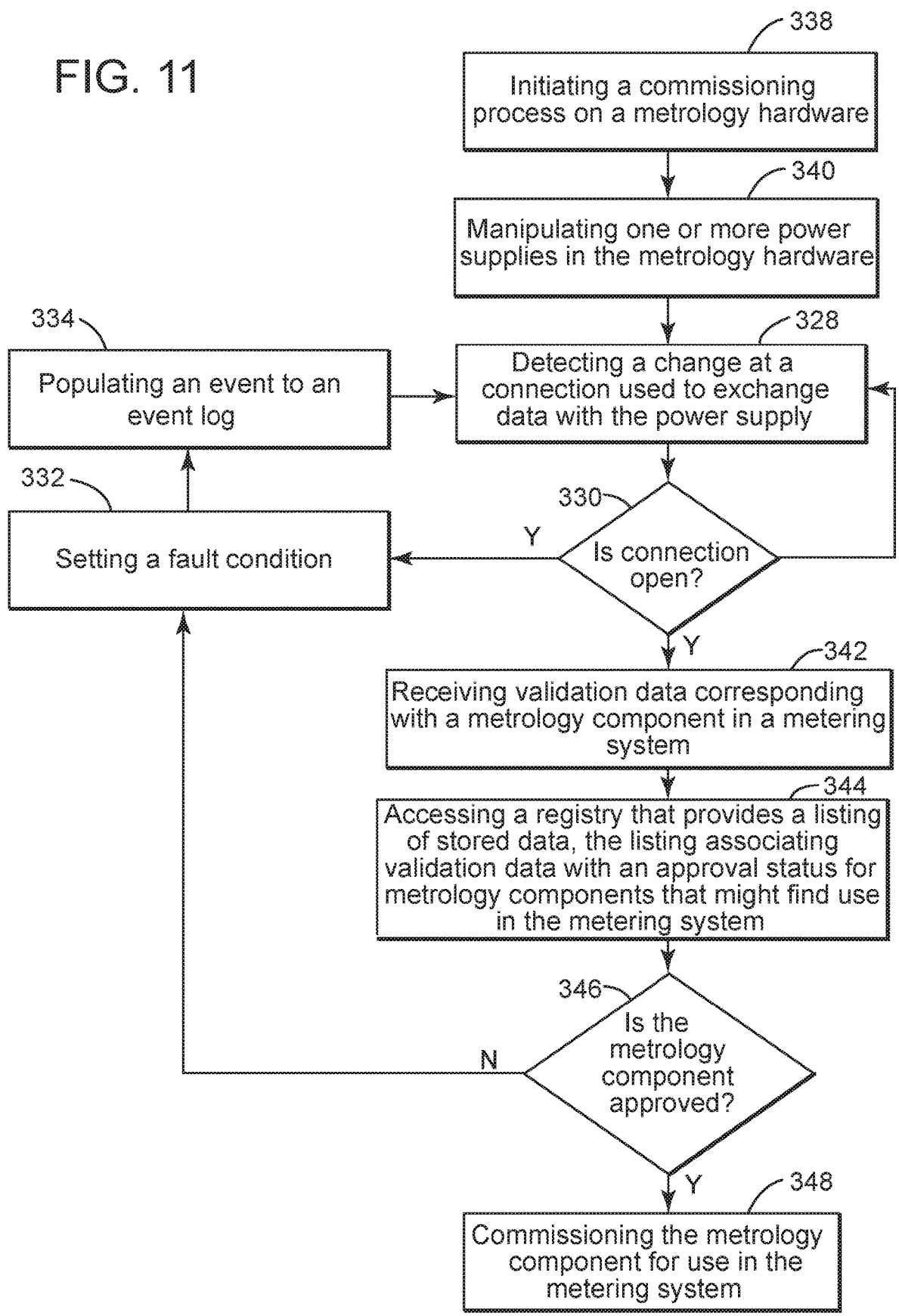
FIG. 11 depicts a flow diagram of an example of the method of FIG. 10 to communicate between the "smart" power supply and other components of the gas meter.

FIG. 11 illustrates a flow diagram of an example of the method 300 of FIG. 10 with stages to trace use of the cells on the power supply 100. The method 300 may include, at stage 342, receiving identifier data from a power supply. The method 300 may also include, at stage 344, accessing a registry with stored data in a listing having entries that associate components that might find use in the gas meter with use data, for example, whether the components can be used in the meter system. The method 300 may further include, at stage 346, comparing the identifier data to the stored data in the listing to determine whether the power supply is approved for use in the gas meter. If negative, the method 300 may include, at stage 332, setting a fault condition and, at stage 334, populating an event to an event log. Operation of the method 300 may cease at stage 334, effectively ceasing functions or providing limited functions at the gas meter. In one implementation, the method 300 may return to receiving identifier data at stage 342. On the other hand, if the power supply is approved, the method 300 may include, at stage 348, commissioning the power supply for use in the gas meter and, where applicable, populating an event to an event log at stage 334.

At stage 342, the electronics unit 106 may receive identifier data from the power supply 100. The identifier data may define or describe information that is unique (as compared to others) to the respective power supply 100.

Examples of the information may include serial numbers, cyclic redundancy check (CRC) numbers, checksum values, hash sum values, or the like. Other information may define operative conditions or status for the power supply 100, for example, performance data that is stored locally on the device. This information may be stored on the power supply 100 at the time of manufacture. In one implementation, the power supply 100 may be configured so that all or part of the identifier data cannot be changed or modified once manufacture or assembly is complete. This feature may deter tampering to ensure that the power supply and the gas meter, generally, will meet legal and regulatory requirements for purposes of metering of material 110.

At stage 344, the electronics unit 106 may access a registry with a listing of stored data that associates components with a use status. Table 1 below provides an example of this listing.

TABLE 1

| S/N | Device Type | Performance data | Firmware data | Physical data | Use Status |
|-----|-------------|------------------|---------------|---------------|----------------|
| 001 | Power S | P1 | V1 | P1 | Compatible |
| 002 | Power S | P2 | V2 | P2 | Compatible |
| 003 | Power S | P3 | V3 | P3 | Not Compatible |
| 004 | Power S | P4 | V4 | P4 | Not Compatible |

The listing above may form an "integrity" log that the electronics unit uses to properly evaluate and integrate the power supply 100 into the gas meter 102. Stored data in the entries may define various characteristics for system components, like power supply 100 ("Power S"). As shown above, the listing may have entries for separate power supplies, often distinguished by identifying information such as serial number (S/N) and device type. The entries may also include operating information that may relate specifically to the power supply 100 of the entry in the listing. The operating information may include "performance data," for example, values for power output, "firmware data," for example, information that describes the latest version that might be found on the power supply 100, and "physical data" as relates to the power supply. The physical data may correlate, for example, with the number of cells or other characteristics (e.g., size, weight, etc.). As also shown, the entries in the listing may include a use status that reflects whether the power supply 100 is "compatible" or "not compatible;" however other indicators to convey that the power supply 100 may or may not be acceptable for use in the gas meter 102 may be useful as well. Approval may indicate the power supply 100 meets power demand requirements, as well as with appropriate safety expectations, but this does not always need to be the case.

At stage 346, the electronics unit 106 may compare the identifier data to the stored data in the listing to determine whether the power supply 100 is approved for use in the gas meter 102. This stage is useful to certify that the power supply 100 is "compatible" prior to being commissioned and operates in the gas meter 102. This stage may include one or more stages as necessary so as to properly commission the power supply 100. These stages may, for example, include determining whether the power supply 100 meets certain initial criteria. The initial criteria may distinguish the power supply 100 by type (e.g., hardware and executable instructions), version or revision, model or serial number, and other functional or physical characteristics. For hardware, the method 300 may also include one or more stages to ensure power supply is located or coupled with the electronics unit 106 at a location (e.g., the power connector 196) appropriate for its type and functions. The stages may use signals from connectors to discern the location of the device on the gas meter 102.

The stages may also evaluate the status of the power supply 100. In one implementation, the method 300 may include stages for confirming that the identifier data has not been corrupted or does not include corrupt information. Corruption might happen, for example, as are result of tampering with the hardware or by exposing the hardware to environmental conditions (e.g., radiation, temperature, etc.). For firmware, the method 300 may use version history and related items that may be useful to distinguish one set of executable instructions from another as well as for purposes of confirming that the set of executable instructions has not been corrupted.

At stage 332, the electronics unit 106 may set a fault condition in response to the assessment of the identifier data (at stage 346). Examples of the fault condition may take the form of an alert, either audio or visually discernable, or, in some examples, by way of electronic messaging (e.g., email, text message, etc.) that can resolve on a computing device like a smartphone or tablet. In one implementation, the fault condition may interfere with operation of one or more functions on the gas meter 102, even ceasing functionality of the whole system if desired. The fault condition may also convey information about the status of the commissioning process. This information may indicate that serial numbers are incorrect or unreadable, that physical data of the power supply 100 is not compatible or correct, or that firmware versions and updates on the power supply 100 are out of date or corrupted.

At stage 334, the electronics unit 106 can populate an event to the event log. This event log may reside on the electronics unit 106 as well as on the power supply 100. In one implementation, the event can describe dated records of problems or issues that arise during the commissioning process. The event can also associate data and actions taken (e.g., calibration, updates, etc.) to commission the power supply 100 for use in the gas meter 106. Relevant data may include updated to serial numbers and time stamps (e.g., month, day, year, etc.). The actions may identify an end user (e.g., a technician) and related password that could be required in order to change the configuration or update the gas meter with, for example, replacements for the power supply 100.

At stage 348, the electronics unit 106 can commission the power supply 100 for use in the gas meter 102. This stage may change operation of the electronics unit 106 to accept or use the power supply 100. Changes may the integrity log to include new entries or to revise existing entries with information about the connected and commissioned power supply 100.

In light of the forgoing, the embodiments operate with "smart" technology to improve operation in metrology hardware. The resulting "smart" power supply may provide on-board diagnostics to maintain data that reflects charge and other operating parameters. Diagnostics, whether on the power supply or metrology hardware, may process the data. At least one technical effect is to enable the metrology hardware to properly diagnose operating problems, which may reduce costs, typically labor, by avoiding unnecessary maintenance or, on the other hand, accelerating maintenance to avoid problems down the road.

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein.

Computing components (e.g., memory and processor) can embody hardware that incorporates with other hardware (e.g., circuitry) to form a unitary and/or monolithic unit devised to execute computer programs and/or executable instructions (e.g., in the form of firmware and software). As noted herein, exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses to describe embodiments contemplated within the scope and spirit of this disclosure.

What is claimed is:

1. Metrology hardware, comprising:
a flow responsive unit in proximity to flow of fluid;
electronics coupled with the flow responsive unit to quantify a parameter of the flow of fluid in response to interaction with the flow responsive unit; and
a power supply coupled with the electronics to deliver a power signal to energize the electronics, the power supply comprising an energy source and circuitry that stores data and generates a signal that includes identifier data,
wherein the electronics processes the signal from the power supply to use the identifier data to register connection of the power supply with the electronics, and
wherein the signal indicates that discharge to the electronics exceeds a power consumption threshold level.

2. The metrology hardware of claim 1, wherein the circuitry on the power supply can measure discharge of the energy source.

3. The metrology hardware of claim 1, wherein the circuitry on the power supply can measure remaining charge on the energy source.

4. The metrology hardware of claim 1, wherein the signal indicates remaining charge on the energy source.

5. The metrology hardware of claim 1, wherein the energy source comprises a plurality of batteries.

6. The metrology hardware of claim 5, wherein the circuitry on the power supply can measure discharge from the batteries individually.

7. The metrology hardware of claim 5, wherein the circuitry can regulate flow of energy from each of the batteries, individually, to meet power demand from the electronics.

8. The metrology hardware of claim 1, wherein the flow responsive unit comprises impellers that rotate in response to the flow of fluid.

9. The metrology hardware of claim 8, further comprising:
a meter body that encloses the impellers and has flanged ends to attach to exposed pipe sections so as to permit the flow of fluid to impinge on the impellers.

10. A gas meter, comprising:
a meter body forming an internal pathway that terminates at flanged openings;
mechanics disposed in the internal pathway that moves in response to flow of fluid that impinges thereon;
electronics coupled with the mechanics, the electronics operative to generate a value in response to movement of the mechanics; and
a power supply releasable coupleable with the electronics, the power supply comprising and energy source and circuitry with a processor, memory coupled with the processor, and executable instructions stored on the memory, the executable instructions being configured, when executed by the processor, to cause the power supply to,
calculate a value for charge on the energy source;
generate a signal to convey the value to the electronics;
set a threshold power consumption level;
monitor discharge from the energy source;
compare the discharge to the threshold power consumption level; and
generate a signal to convey a relationship between the discharge to the power consumption threshold level,
wherein the electronics processes the signal to modify operation of a component resident on said gas meter.

11. The gas meter of claim 10, wherein the circuitry on the power supply can power limit the signal.

12. The gas meter of claim 10, wherein the circuitry on the power supply can power limit the discharge to the electronics.

13. The gas meter of claim 10, wherein the energy source comprises more than one battery.

14. The gas meter of claim 13, wherein the circuitry monitors discharge from each battery, individually.

15. A method, comprising:
using first circuitry on a gas meter to,
recognize connection of a power supply to the gas meter;
exchange signals with the power supply to receive identifier data from the power supply; and using the identifier data to commission the power supply for use on the gas meter; using second circuitry on the power supply to, monitor discharge from the energy source;

compare the discharge to a power consumption threshold level; and generate data that corresponds to a relationship between the discharge to the threshold power consumption level;

wherein the first circuitry processes the data to modify operation of a component resident on the gas meter.

16. The method of claim 15, further comprising:
using second circuitry on the power supply to,
    generate data for use on the gas meter that corresponds with discharge from the power supply.

17. The method of claim 15, further comprising:
using second circuitry on the power supply to,
regulate discharge from more than one battery to provide power to the first circuitry on the gas meter.

\* \* \* \* \*